(12) United States Patent
Hamilton et al.

(10) Patent No.: US 9,697,496 B2
(45) Date of Patent: Jul. 4, 2017

(54) SYSTEMS, METHODS, AND COMPUTER PROGRAM PRODUCTS FOR FACILITATING A DISASTER RECOVERY EFFORT TO REPAIR AND RESTORE SERVICE PROVIDER NETWORKS AFFECTED BY A DISASTER

(75) Inventors: Robert Hamilton, Springfield, IL (US); Jeremy Sullins, Blue Springs, MO (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1967 days.

(21) Appl. No.: 12/769,771

(22) Filed: Apr. 29, 2010

(65) Prior Publication Data

US 2011/0270767 A1 Nov. 3, 2011

(51) Int. Cl.
  *G06Q 30/02* (2012.01)
  *G06Q 10/10* (2012.01)
  *G06Q 10/06* (2012.01)
  *G06Q 30/06* (2012.01)
  *G06Q 10/08* (2012.01)
  *G06Q 10/00* (2012.01)
  *G06Q 50/16* (2012.01)

(52) U.S. Cl.
  CPC .......... *G06Q 10/10* (2013.01); *G06Q 10/067* (2013.01); *G06Q 10/103* (2013.01); *G06Q 10/20* (2013.01); *G06Q 50/163* (2013.01)

(58) Field of Classification Search
  CPC .... G06Q 10/10; G06Q 50/163; G06Q 10/067; G06Q 10/103; G06Q 10/20
  USPC ....... 455/404.2; 705/1.1, 301, 305, 314, 348
  See application file for complete search history.

(56) References Cited

U.S. PATENT DOCUMENTS

| 6,711,535 B2 | 3/2004 | Ford et al. |
| 7,313,759 B2 | 12/2007 | Sinisi |
| 2009/0019075 A1* | 1/2009 | Hutchinson et al. ......... 707/102 |
| 2011/0117878 A1* | 5/2011 | Barash et al. ............. 455/404.2 |

* cited by examiner

*Primary Examiner* — Jonathan Ouellette
(74) *Attorney, Agent, or Firm* — Hartman & Citrin LLC

(57) ABSTRACT

Systems, methods, and computer program products are for processing damage survey information associated with a disaster event. According to one aspect, a method for processing damage survey information associated with a disaster event includes in response to the disaster event, receiving, at a disaster recovery system (DRS), the damage survey information. In some embodiments, the damage survey information includes an area of impact that defines an area in which at least one physical plant was damaged in the disaster event and a physical plant type identifier (PPTI) for each physical plant damaged in the disaster event. Each PPTI identifies a physical plant type of a plurality of physical plant types. The method also includes analyzing the damage survey information to determine to which of a plurality of disaster recovery dispatch units (DRDUs) the DRS should route the damage survey information and routing the damage survey information to the appropriate DRDUs.

20 Claims, 5 Drawing Sheets

SYSTEMS, METHODS, AND COMPUTER PROGRAM PRODUCTS FOR FACILITATING A DISASTER RECOVERY EFFORT TO REPAIR AND RESTORE SERVICE PROVIDER NETWORKS AFFECTED BY A DISASTER

TECHNICAL FIELD

The present disclosure relates generally to the field of disaster recovery and, more particularly, to systems, methods, and computer program products for facilitating a disaster recovery effort to repair and restore service provider networks affected by a disaster event.

BACKGROUND

In only the last few decades, millions of people have died in earthquakes, volcanic eruptions, hurricanes, droughts, and other natural disasters, and thousands more have died as a result of terrorist attacks. Though a large number of lives could be saved by better overall disaster preparedness, many disasters cannot be predicted with enough certainty or with enough warning to take action before a disaster strikes. More efforts should be made to better anticipate and reduce the risk that disasters pose to human life, and these efforts should be part of an overall strategy that also seeks to reduce humanitarian, economic, and infrastructure impact, post-disaster.

Utility and communications service providers play an integral role in aiding humanitarian relief efforts by providing communications, power, and other resources vital to saving lives and restoring normalcy to an area impacted by a disaster. The faster a service provider can establish temporary resources, the greater the potential for saving and preserving the lives of survivors. Also, the faster a service provider can collect relevant data and assess damage to power lines, communication lines, cell towers, and other physical plants, the faster the service provider can devise a disaster recovery plan to restore permanent utility or communications service to the impacted area.

SUMMARY

The systems, methods, and computer program products of the present disclosure allow fast and efficient processing of damage assessment/survey information and the deployment of disaster recovery units to repair physical plants damaged in a disaster event.

According to one aspect of the present disclosure, a method for processing damage survey information associated with a disaster event includes in response to the disaster event, receiving, at a disaster recovery server (DRS), the damage survey information. In some embodiments, the damage survey information includes an area of impact that defines an area in which at least one physical plant was damaged in the disaster event and a physical plant type identifier (PPTI) for each physical plant damaged in the disaster event. Each PPTI identifies a physical plant type of a plurality of physical plant types. The method also includes analyzing, at the DRS, the damage survey information to determine to which of a plurality of disaster recovery dispatch units (DRDUs) the DRS should route the damage survey information. If the DRS determines through the analysis that all physical plants damaged in the disaster event are associated with the same physical plant type as identified by their respective PPTIs, the method also includes the DRS routing the damage survey information to a DRDU, of the plurality of DRDUs, that is assigned to repair the physical plant type identified by the respective PPTIs. If the DRS determines through the analysis that all physical plants damaged in the disaster event are associated with a physical plant type of a group of physical plant types that a specific DRDU of the plurality of DRDUs is assigned to repair, the method also includes the DRS routing the damage survey information to the specific DRDU of the plurality of DRDUs that is assigned to repair the group of physical plant types. If the DRS determines through the analysis that at least some of the physical plants damaged in the disaster event are associated with different physical plant types that are not all part of the group of physical plant types, as identified by their respective PPTIs, the method also includes the DRS parsing the damage survey information into portions of damage survey information based upon the respective PPTIs and the DRS routing, respectively, the portions of damage survey information to respective DRDUs, of the plurality of DRDUs, based upon the physical plant types that each respective DRDU is assigned to repair.

In one embodiment, the damage survey information also includes a geographical location for each physical plant damaged in the disaster event. The geographical location may include at least one of a latitude/longitude coordinate pair, a state identification, a city identification, a street identification, a cross street identification, an intersection identification, a region identification, and a region subset identification. In this embodiment, the method may also include the DRS determining, based upon the geographical location for each physical plant, whether repair of any of the physical plants damaged in the disaster event should be prioritized. If the DRS determines that repair of a specific physical plant of the physical plants damaged in the disaster event should be prioritized, the method also includes the DRS routing the damage survey information associated with the specific physical plant to the DRDU, of the plurality of DRDUs, that is assigned to repair the specific physical plant as determined through the analysis.

In one embodiment, the method includes a damage assessment for each physical plant damaged in the disaster event, the damage assessment comprising at least one of a damage description, an estimated repair cost, a repair materials source, a revenue impact factor, a humanitarian impact factor, and an emergency services impact factor. In this embodiment, the method may also include the DRS determining, based upon the damage assessment for each physical plant, whether repair of any of the physical plants damaged in the disaster event should be prioritized. If the DRS determines that repair of a specific physical plant of the physical plants damaged in the disaster event should be prioritized, the method also includes the DRS routing the damage survey information associated with the specific physical plant to the DRDU, of the plurality of DRDUs, that is assigned to repair the specific physical plant as determined through the analysis.

In one embodiment, the DRDUs include an engineering DRDU, a construction DRDU, and an installation and maintenance DRDU. In some embodiments, the engineering DRDU is assigned to repair physical plant types selected from a first group of physical plant types, the first group consisting of poles, optical network units (ONUs), distribution units, cross connect units, and remote terminal units (RTUs). In some embodiments, the construction DRDU is assigned to repair physical plant types selected from a second group of physical plant types, the second group consisting of power hazards, tree trimming, and cable spans.

In some embodiments, the installation and maintenance DRDU is assigned to repair drops. The DRDUs may additionally or alternatively be assigned to repair other physical plant types based upon the needs of a particular service provider.

In one embodiment, the method also includes the DRS receiving an update from a DRDU, of the plurality of DRDUs, to which the DRS routed the damage survey information. The update may include, for example, an indication that a project or sub-project created by the DRDU has been completed, that a trouble ticket has been closed out, or a project milestone has been reached. In some embodiments, the DRS receives the update intermittently, such as a random feed, and/or periodically, such as by an hourly feed, a daily feed, a weekly feed, or a monthly feed.

In one embodiment, the method also includes the DRS generating a report that includes at least one of an actual repair cost, a revenue loss value, a repair materials source, and a subscriber loss value.

According to another aspect of the present disclosure, a computer-readable medium of a DRS includes instructions that, when executed by a processor of the DRS, cause the processor to perform the aforementioned method for processing damage survey information associated with a disaster event.

According to another aspect of the present disclosure, a disaster recover system (DSR) configured to process damage survey information associated with a disaster event includes an input interface configured to receive the damage survey information associated with the disaster event, a processor, and a computer-readable medium including instructions that, when executed by the processor, cause the processor to perform the aforementioned method for processing the damage survey information associated with the disaster event.

DETAILED DESCRIPTION

Figure 1:
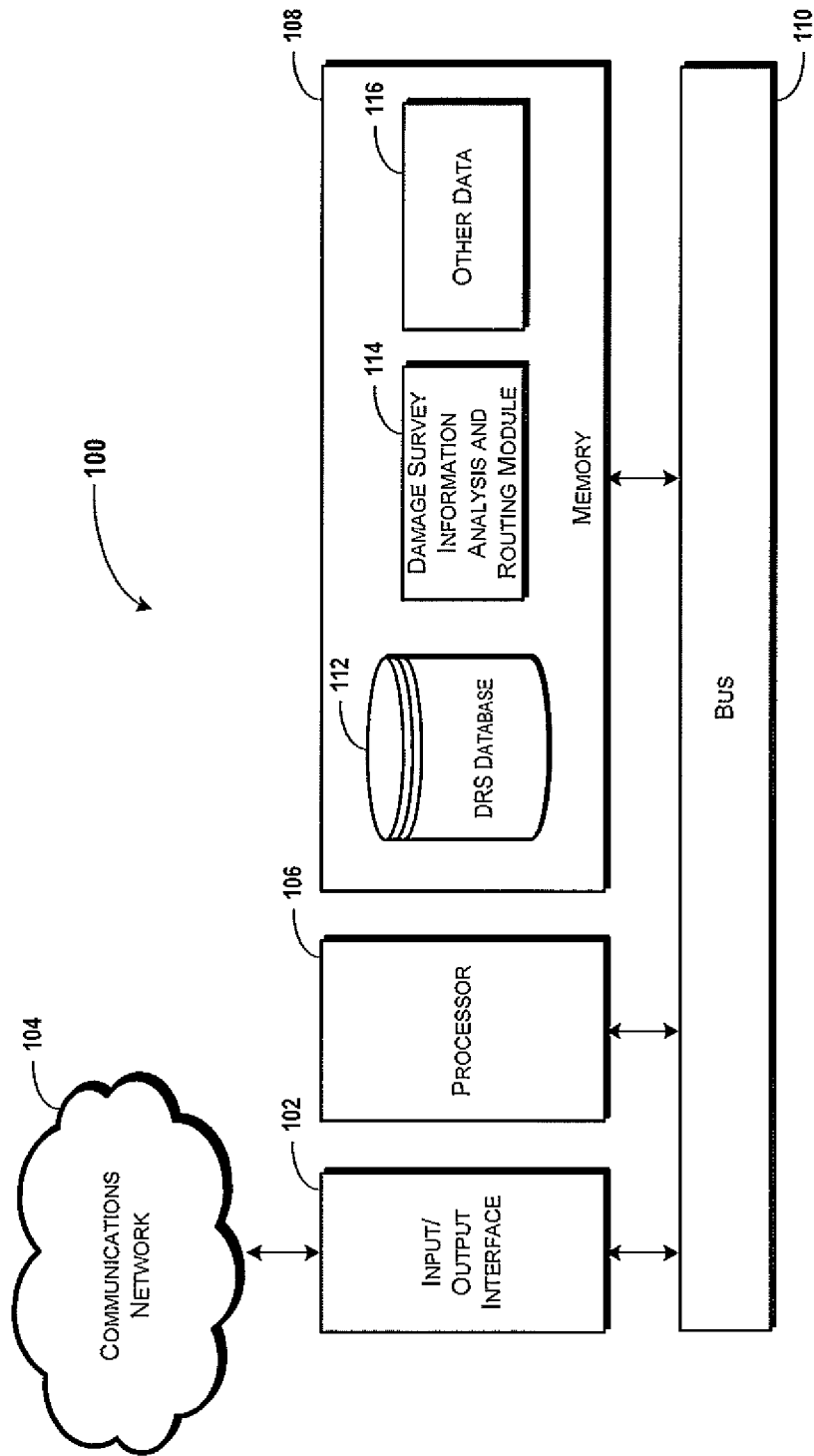
FIG. 1 illustrates an exemplary disaster recovery system (DRS) and components thereof, according to an embodiment of the present disclosure.

As required, detailed embodiments of the present disclosure are provided herein. The disclosed embodiments are merely examples that may be embodied in various and alternative forms, and combinations thereof. As used herein, for example, exemplary, and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the systems, methods, and computer program products of the present disclosure. Therefore, specific structural and functional details disclosed herein are not to be interpreted as limiting, but merely as a basis for the claims and as a representative basis for teaching one skilled in the art to variously employ the present disclosure.

While the methods of the present disclosure are often described in a general context of computer-executable instructions, the methods of the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, smartphones, combinations thereof, and the like.

As used herein, the terms "disaster" and "disaster event" refer broadly to all types of natural disasters including, for example, tornados, hurricanes, tsunamis, earthquakes, thunderstorms, winter storms, volcanoes, wildfires, landslides, floods, extreme temperatures, and the like; as well as other types of disasters including, for example, chemical emergencies, biohazard emergencies, nuclear emergencies including nuclear attacks and nuclear power plant emergencies, oil spills, war-time events, fires, dam failures, terrorism, vehicular accidents, man-made disasters and other events that impact one or more physical plants owned and/or operated by a service provider.

As used herein, the term "service provider" refers broadly to any type of service provider that owns and/or operates physical plants that are used to perform operations alone or in combination with other plants to facilitate providing a particular service. Exemplary services include, for example, a wireless communications service including, but not limited to, cellular communications, WIFI communications, WIMAX communications, satellite communications, satellite television, satellite radio, FM/AM/HD radio, and the like; a landline communications service including, but not limited to, landline telephone, digital subscriber line (DSL), cable television, cable Internet, voice over Internet protocol (VoIP), and the like; and provision of a public utility such as electricity, natural gas, water, sewage, garbage pick up, and the like.

As used herein, "physical plant" refers broadly to any type of physical component or element owned and/or operated by a service provider. Those skilled in the art will appreciate the general complexity of service provider networks and the sometimes large number of physical plants and different physical plant types needed to support operations by any particular service provider. For example, a service provider may have hundreds, thousands, tens of thousands, or a greater number of physical plants, each of which may have a different or the same physical plant type. As such, it should be understood that the systems, methods, and computer program products described herein can be used in support of a repair and restoration effort to any physical plant type that is associated with any of the above service providers, and the like.

By way of a non-limiting example, those skilled in the art will appreciate the use of physical plant types such as poles, optical network units, distribution units, cross connect units, remote terminal units, cable spans, drops, components thereof, and the like by landline telecommunications service providers. By way of another non-limiting example, those skilled in the art will appreciate the use of cellular base stations, base station controllers, mobile switching centers, components thereof, and the like by wireless service providers. It should also be understood that physical plants may also include temporary network components such as temporary base stations deployed by a wireless service provider following a disaster event to facilitate wireless communication in an area affected by the disaster event.

Referring now to the figures, FIG. 1 illustrates an exemplary disaster recovery system (DRS) 100 and components thereof, according an exemplary embodiment of the present disclosure. Although connections are not shown between all components illustrated in FIG. 1, the components can interact with each other to carry out various system functions described herein. It should be understood that FIG. 1 and the following description are intended to provide a general description of a suitable environment in which the various aspects of some embodiments of the present disclosure can be implemented.

The DRS 100 is configured to receive damage survey information from a variety of sources and process the damage survey information to determine to which of a plurality of disaster recovery dispatch units (DRDUs) (not shown in FIG. 1) at least a portion of the damage survey information should be routed. The damage survey information may be collected by damage assessment teams that are deployed to an impacted area following a disaster event, and provided as an input to the DRS 100 via an input interface 102.

According to an embodiment, the damage survey information includes an area of impact and a physical plant type identifier (PTTI). The area of impact defines an area in which at least one physical plant was damaged in the disaster event. The area of impact may include a latitude/longitude coordinate pair, a state identification, a city identification, a street identification, a cross street identification, an intersection identification, a region identification, and/or a region subset identification. The PPTI identifies the type of physical plant damaged in the disaster event.

In some embodiments, the damage survey information includes a geographical location for each physical plant damaged in the disaster event. The geographical location may include a particular location of each physical plant as identified by a latitude/longitude coordinate pair, a state identification, a city identification, a street identification, a cross street identification, an intersection identification, a region identification, and/or a region subset identification. The geographical location for each physical plant may exist within the area of impact or may itself be the area of impact.

In some embodiments, the damage survey information also includes a damage assessment for each physical plant damaged in the disaster event. The damage assessment may include, for example, a damage description, an estimated repair cost, a repair materials source (e.g., component manufacture), a revenue impact factor (e.g., an estimation of revenue loss as a result of the damage to the physical plant(s) in the impacted area), a humanitarian impact factor (e.g., death toll, number of people affected by disaster event, etc.), and/or an emergency services impact factor (e.g., ability/inability for emergency services to use service provider resources to help those affected in the impacted area).

The input/output interface 102 may include an input device such as, for example, a keyboard, a pointing device, an image scanner, a scanner combined with optical character recognition (OCR) software, a microphone, a controller, a joystick, a composite input device combining any of these input devices, and the like. The input/output device 102 may facilitate manual input of the damage survey information into the DRS 100, such as by using a keyboard or by speaking into the microphone. The input/output device 102 may additionally or alternatively facilitate electronic input of the damage survey information via an image scanner or a scanner configured to use OCR software to extract text that is representative of the damage survey information from a form or other paper on which a member of a damage assessment team has recorded the damage survey information.

The input/output device 102 may include a communications link to an external computer system, such as a terminal interface (FIG. 2), which may be located proximate to or remote to the DRS 100 and may facilitate manual or electronic input of damage survey information. The input/output device 102 may include a communications link to a communications network 104.

The communications network 104 may be the Internet, an intranet, an extranet, a landline communications network, a WIFI network, a WIMAX network, or a cellular network. The communications network 104, in some embodiments, allows for remote data collection via remote data collection units, such as portable computers, smartphones, and other mobile devices that are configured with data collection software. The data collection software may, automatically or upon request from a user, send damage survey information recorded by a user of the remote data collection unit or recorded by the remote data collection unit to the DRS 100. Alternatively, the remote data collection units may access a web interface, such as a website hosted by or for the DRS 100, to provide damage survey information to the DRS 100 via the communications network 104.

The DRS 100 may also receive updates from DRDUs via the input/output interface 102. The updates may include, for example, an indication that a project or sub-project created by the DRDU has been completed, that a trouble ticket has been closed out, or that a project milestone has been reached. In some embodiments, the DRS receives the update intermittently, such as a random feed, and/or periodically, such as by an hourly feed, a daily feed, a weekly feed, or a monthly feed.

The DRS 100 may also generate and provide reports to external systems and/or personnel. For example, the DRS 100 may generate a report to management indicating a status of an overall repair and restoration project or individual projects or sub-projects within the overall repair and restoration project. The granularity of such reports may vary based upon the needs of the party receiving the report.

The illustrated DRS 100 also includes at least one processor 106 that is in communication with at least one memory 108 via a memory/data bus 110. The processor 106 is configured to execute instructions stored on at least one tangible computer-readable medium, such as the memory 108, to perform actions associated with processing damage survey information in accordance with the methods described herein below.

The term "memory," as used herein to describe the memory 108, collectively includes all memory types associated with the DRS 100 such as, but not limited to, processor registers, processor cache, random access memory (RAM), other volatile memory forms, and non-volatile, semi-permanent or permanent memory types; for example, tape-based media, optical media, solid state media, hard disks, combinations thereof, and the like. While the memory 108 is illustrated as residing proximate the processor 106, it should be understood that the memory 108 is in some embodiments a remotely accessed storage system, such as a server or database on the communications network 104, a remote hard disk drive, a removable storage medium, or the like. Moreover, the memory 108 is intended to encompass network memory and/or other storage devices in wired or wireless communication with the DRS 100. Thus, any of the damage survey information, map data, applications, and/or software described below can be stored within the memory 108 and/or accessed via network connections to other data processing systems (not shown) that may include a local area network (LAN), a metropolitan area network (MAN), or a wide area network (WAN), for example.

The illustrated memory 108 includes a DRS database 112, a damage survey information analysis and routing module 114, and other data 116. The DRS database 112 functions as a central repository for all damage survey information received via the input/output interface 102. The DRS database 112 may be configured to organize the damage survey information according to any known database model including, for example, a relational model, a hierarchical model, or a network model. The DRS database 112 may be a single database, as illustrated, or one of several databases that collectively provide functions of the DRS database 112.

According to an embodiment, the DRS database 112 generates projects and assigns the received damage survey information to projects as appropriate based upon, for example, the impacted area, the physical plant types damaged in the disaster, or the DRDU(s) assigned to repair the damaged physical plants. Other project categories may be requested by management personnel, management systems, or other external systems and in some embodiments are generated by the DRS database 112 in response. Each project generated by the DRS database 112 may include one or more sub-projects that are to be completed by one or more DRDUs. A DRDU may notify the DRS database 112 of completion of a sub-project via an update. After each sub-project is completed, the DRS database 112 in some embodiments closes out a project and reports its completion to external systems or personnel, such as management.

The damage survey information analysis and routing module 114 is a collection of instructions, such as a software application, that can be executed by the processor 106 to perform the methods described herein. Briefly, the instructions instruct the processor 106 on how to analyze the damage survey information to determine to which DRDU(s) the damage survey information should be routed after a disaster occurs.

The other data 116 may include mapping software, map data, cost analysis software, operating system software, drivers, firmware, interoperability software for facilitating communication with external DRDU systems (illustrated in FIG. 2), report data, update data, estimated repair costs, project status reports, and other data utilized by the DRS 100 during the methods described herein. While this data and software is described as residing in a separate memory location from the DRS database 112, the other data 116 may be included in the DRS database 112.

Figure 2:
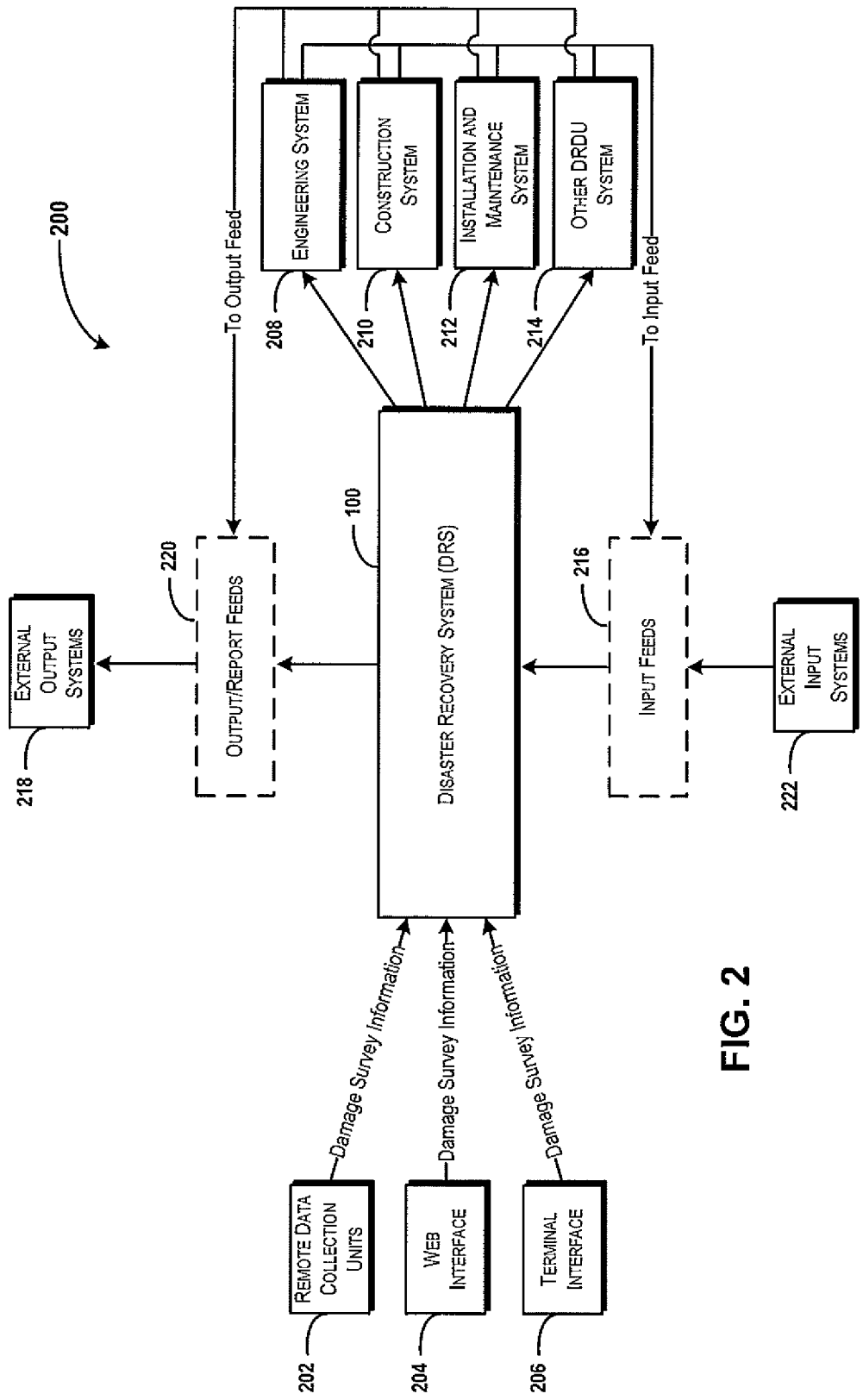
FIG. 2 illustrates an exemplary environment in which the DRS may operate, according to an embodiment of the present disclosure.

FIG. 2 illustrates an exemplary environment 200 in which the DRS 100 can operate. As illustrated, the DRS 100 is in communication with input sources, input feeds, output feeds, and DRDU systems. The illustrated DRS 100 receives damage survey information from one or more remote data collection units 202, one or more web interfaces 204, and/or one or more terminal interfaces 206.

The remote data collection units 202 may include a mobile device, such as a smartphone or portable computer (e.g., handheld computer, laptop, notebook, netbook, and the like), configured to operate remote data collection software to aid damage assessment team members in collecting damage survey information and providing that information to the DRS 100, for example, via the communications network 104. Alternatively, the remote data collection units 202 may include or be in communication with one or more sensors configured to capture data such as, but not limited to, sound, image, video, light, motion temperature, magnetic fields, gravity, humidity, vibration, pressure, electrical fields, environmental molecule/gas data, and the like. As such, the remote data collection units 202 in some embodiments are configured as part of a remote controlled or autonomous robot used to perform damage assessment tasks and capture data via the one or more sensors.

The web interface 204 may be a website that is accessible by the DRS 100 via a local or remote computer system (not shown) or the remote data collection units 202. The website may require authentication credentials, such as a username, password, security question answer, and/or other common authentication credentials used to provide secure access to websites. The web interface 204 may be accessible via the communications network 104. The web interface 204 may include text, image, video, audio, map, and/or other static or dynamic information.

The terminal interface 206 may be a local or remote computer terminal that facilitates manual entry of damage survey information. The terminal interface 206 in some embodiments is a so-called dumb terminal or a stand-alone computer system. The terminal interface 206 in some embodiments is in communication with input devices (not shown), such as, for example, a keyboard, a pointing device, an image scanner, a scanner combined with OCR software, a microphone, a controller, a joystick, a composite input device combining any of these input devices, and the like. The input device may facilitate manual input of the damage survey information, such as by using a keyboard or speaking into the microphone. The input device in some embodiments additionally or alternatively facilitates electronic input of the damage survey information via an image scanner or a scanner configured to use OCR software to extract text that is representative of the damage survey information from a form or other paper on which a member of a damage assessment team has recorded the damage survey information.

The illustrated DRS 100 is also in communication with a plurality of exemplary DRDU systems including an engineering DRDU system 208, a construction DRDU system 210, an installation and maintenance DRDU system 212, and an other DRDU system 214. The DRDU systems 208, 210, 212, 214 may be used by DRDU members to perform various functions or tasks related to the repair and restoration of physical plants damaged in the disaster. In some embodiments, these functions/tasks are set for completion as stand-alone functions/tasks or are associated with projects or sub-projects of the DRS 100 or projects or sub-projects of one or more of the DRDU systems 208, 210, 212, 214. The DRDU systems 208, 210, 212, 214 can, for example, (1) create projects, (2) track project or sub-project progress, (3) update project statuses, (4) communicate with other DRDUs to share project statuses, (5) close out trouble tickets or tasks that are to be completed by a specific DRDU, (6) release projects to other DRDUs after work by a particular DRDU has been completed, (7) provide updates and reports to the DRS 100 via input feeds 216, and (8) provide updates and reports directly to external output systems 218 (e.g., management computer systems) via output/report feeds 220.

According to an exemplary embodiment in which the DRS 100 is used by a landline telecommunication service provider, an engineering DRDU is assigned to repair physical plants of a landline telecommunications network including, for example, poles, optical network units (ONUs), distribution units, cross connect units, and remote terminal units (RTUs); a construction DRDU is assigned to repair physical plant types including, for example, power hazards, tree trimming, and cable spans; and an installation and maintenance DRDU is assigned to repair drops.

The DRDU systems 208, 210, 212, 214 may be configured as a hardware, software or a combination thereof. For example, the DRDU systems 208, 210, 212, 214 may include one or more processors, one or more memory modules, one or more data/memory busses, and/or one or more input/output interfaces. In general, the DRDU systems 208, 210, 212, 214 may be computer systems in wireline or wireless communication with the DRS 100. It is contemplated that the DRDU systems 208, 210, 212, 214 can communicate with the DRS 100 via the communications network 104 or directly via the input/output interface 102 shown in FIG. 1. In some embodiments, the DRDU systems 208, 210, 212, 214 communicate via short range communications such as, but not limited to, infrared, IRDA, BLUETOOTH, ZIGBEE, wireless USB, unlicensed radio spectrum, and the like.

The DRS 100 is also configured to receive information from external input systems 222. The external input systems 222 may include, but are not limited to, National Weather Service (NWS) systems, National Oceanic and Atmospheric Administration (NOAA) systems, Central Intelligence Agency (CIA) systems, Federal Bureau of Investigation (FBI) systems, United States Geological Survey (USGS) systems, telecommunication service provider systems, Geographic Information System (GIS) systems, and the like. The input feeds 216, including information from these sources, are provided to the DRS 100 by way of the communications network 104 or other communications link.

Figure 3:
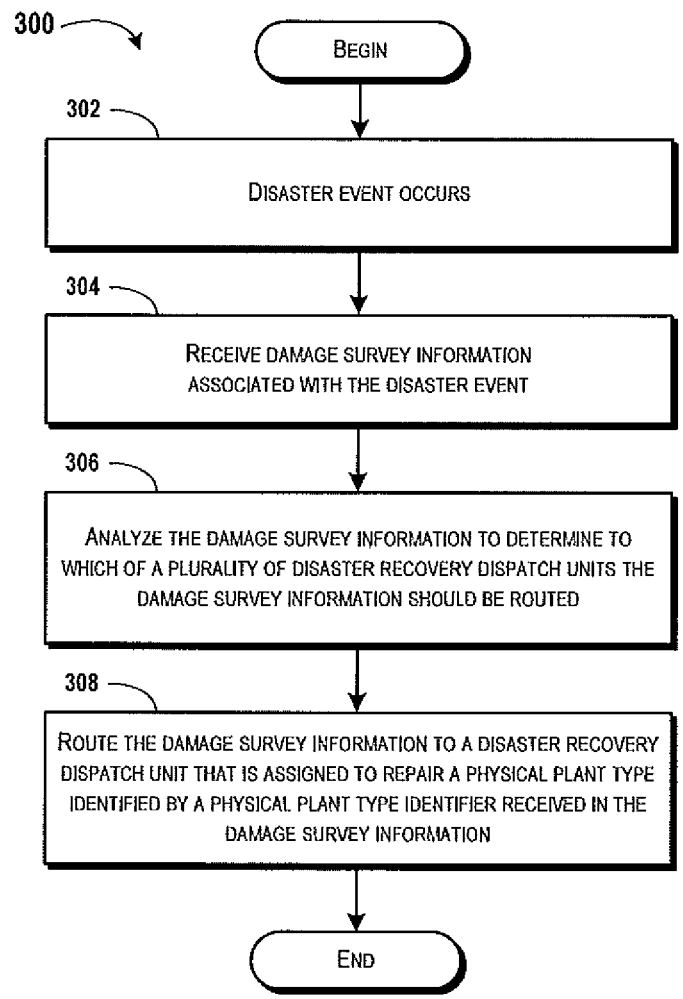
FIG. 3 illustrates an exemplary method for processing damage survey information, according to an embodiment of the present disclosure.

FIG. 3 illustrates an exemplary method 300 for processing damage survey information, according to an embodiment of the present disclosure. It should be understood that the steps of the method 300 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 300 can be ended at any time. In certain embodiments, some or all steps of this process, and/or substantially equivalent steps can be performed by execution of computer-readable instructions stored or included on a computer-readable medium, such as the memory 108 of the DRS 100.

The method 300 begins and flow proceeds to block 302, whereat a disaster event occurs. At block 304, the DRS 100 receives damage survey information associated with the disaster event via any of the means described above with reference to FIGS. 1 and 2.

At block 306, the DRS 100 analyzes the damage survey information to determine to which of a plurality of DRDUs the damage survey information should be routed. In one exemplary situation, the DRS 100 determines through the analysis that all physical plants damaged in the disaster event are associated with the same physical plant type because each of the physical plants damaged in the disaster event is identified by the same PPTI. If the damage survey information received at block 304 includes PPTIs identifying a single physical plant type, the DRS 100 determines, at block 306, that the DRDU assigned to repair that physical plant type is the appropriate DRDU to which the damage survey information should be routed. In some embodiments, the appropriate DRDU is not the only DRDU assigned to repair the identified physical plant type, but is the DRDU that is assigned to perform one or more initial tasks using the damage survey information. At block 308, the DRS 100 routes the damage survey information to the DRDU that is assigned to repair, at least initially, the physical plant type identified by the PPTIs received in the damage survey information. The method 300 can end.

In another exemplary situation, the DRS 100 determines through the analysis at block 306 that all physical plants damaged in the disaster event are associated with a physical plant type, as identified by their respective PPTIs, selected from a group of physical plant types that a specific DRDU of the plurality of DRDUs is assigned to repair. If the damage survey information received at block 304 includes PPTIs identifying only physical plant types that the specific DRDU is assigned to repair, the DRS 100 determines, at block 306, that the specific DRDU is the DRDU to which all of the damage survey information regarding these physical plant types should be routed. At block 308, the DRS 100 routes the damage survey information to the DRDU that is assigned to repair, at least initially, the physical plant types identified in the PPTIs received in the damage survey information. The method 300 can end.

In another exemplary situation, the DRS 100 determines through the analysis that at least some of the physical plants damaged in the disaster event are associated with different physical plant types, and that the different physical plants are not all part of a predefined group of physical plant types that any one DRDU is assigned to repair. If the damage survey information received at block 304 includes PPTIs identifying different physical plant types that multiple DRDUs are assigned to repair, the DRS 100 determines, at block 306, that the damage survey information should be routed to the respective DRDUs assigned to repair the physical plant types. At block 308, the DRS 100 routes the damage survey information to the DRDUs that are assigned to repair, at least initially, the physical plant types identified by the PPTIs in the damage survey information. In a particular embodiment, the DRS 100 parses the damage survey information into portions of damage survey information based upon PPTI and routes the portions of damage survey information to each DRDU that is assigned to repair the physical plant type identified by each PPTI. The method 300 can end.

The DRS 100 may also determine, based upon geographical location of physical plants damaged in the disaster event, damage assessments, or other damage survey information, whether repair of any of the physical plants should be prioritized. If the DRS 100 determines that repair of a specific physical plant damaged in the disaster event should be prioritized, the DRS 100 may then first route the damage survey information associated with that physical plant to the appropriate DRDU that is assigned to repair the physical plant type of the specific physical plants prior to routing other damage survey information to other DRDUs. The prioritization could be, for example, the DRS 100 adding a priority indication to the transmission (e.g., urgent identifier/flag) and/or the DRS 100 determining to transmit this priority DSI before processing, or processing and transmitting, lower priority damage survey information.

Figure 4:
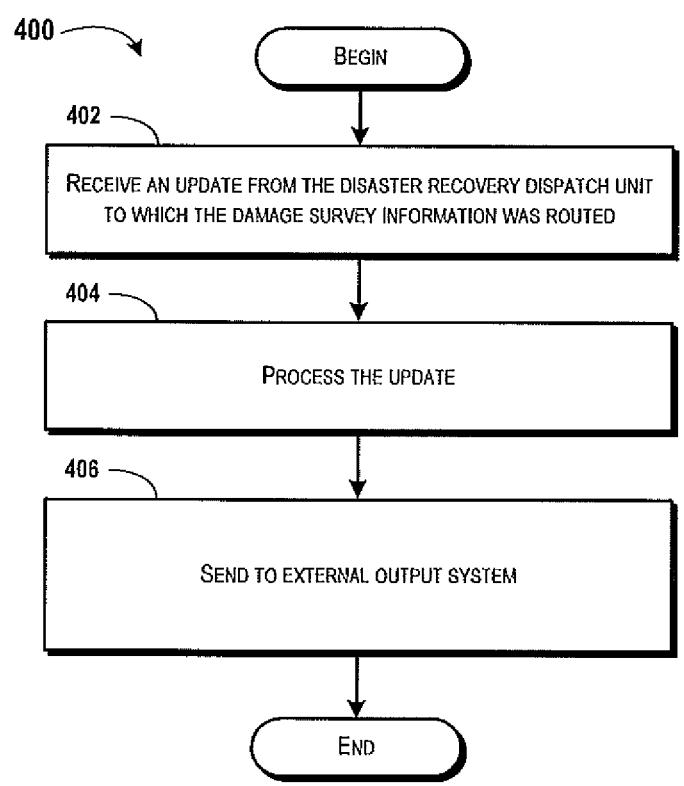
FIG. 4 illustrates an exemplary method for processing project updates, according to an embodiment of the present disclosure.

FIG. 4 illustrates an exemplary method 400 for processing an update at the DRS 100, according to an embodiment of the present disclosure. It should be understood that the steps of the method 400 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 400 can be ended at any time. In certain embodiments, some or all steps of this process, and/or substantially equivalent steps can be performed by execution of computer-readable instructions stored or included on a computer-readable medium, such as the memory 108 of the DRS 100.

The method 400 begins and flow proceeds to block 402, whereat the DRS 100 receives an update from a DRDU to which damage survey information was routed. The update may include an indication that a project or sub-project created by the DRDU has been completed or a milestone for that project has been reached. The update may be received via the input feed 216 from the DRDU system associated with the DRDU. At block 404, the DRS 100 updates the DRS database 112. In some embodiments, at block 406, the DRS 100 sends the update to at least one of the external output systems 218. The method 400 can end.

Figure 5:
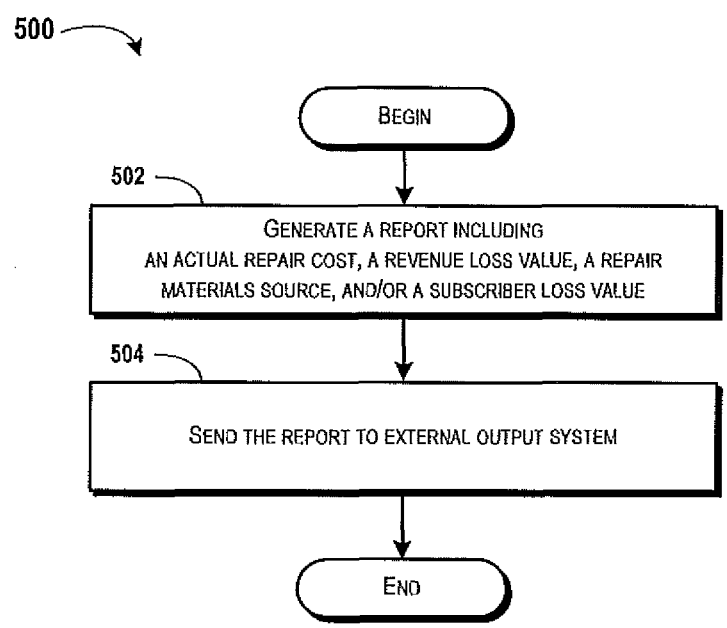
FIG. 5 illustrates an exemplary method for providing reports to external systems, according to an embodiment of the present disclosure.

FIG. 5 illustrates an exemplary method 500 for providing reports to external output systems such as the illustrated external output system 218, according to an embodiment of the present disclosure. The method 500 begins and flow proceeds to block 502, whereat the DRS 100 generates a report including at least one of a project status, a milestone status, an estimated repair cost, an actual repair cost, a revenue loss value, a repair materials source, and/or a subscriber loss value. At block 504, the DRS 100 sends the report to at least one of the external output systems 218. The method 500 can end.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method, for processing damage survey information associated with a disaster event, comprising:
receiving, by a computer server having a computer-processing unit, the damage survey information including:
an area of impact defining an area in which at least one physical plant was damaged in the disaster event; and
a physical plant type identifier for each physical plant damaged in the disaster event, each physical plant type identifier identifying a physical plant type of a plurality of physical plant types;
analyzing, by the computer server, the damage survey information to determine to which of a plurality of disaster recovery dispatch units the computer server should route the damage survey information;
routing, by the computer server, in response to the computer server determining, based on the analyzing, that all physical plants damaged in the disaster event are associated with the same physical plant type, as identified by their respective physical plant type identifiers, the damage survey information to a disaster recovery dispatch unit, of the plurality of disaster recovery dispatch units, that is pre-assigned to repair the physical plant type identified by the respective physical plant type identifiers;
routing, by the computer server, in response to the computer server determining, based on the analyzing, that all physical plants damaged in the disaster event are not of the same type, but are associated by their physical plant types with a physical plant type of a predefined group of physical plant types that a specific disaster recovery dispatch unit of the plurality of disaster recovery dispatch units is pre-assigned to repair, the damage survey information to the specific disaster recovery dispatch unit of the plurality of disaster recovery dispatch units that is pre-assigned to repair the predefined group of physical plant types;
performing, in response to the computer server determining, based on the analyzing, that at least some of the physical plants damaged in the disaster event are associated with different physical plant types that are not all part of the predefined group of physical plant types, according to their respective physical plant type identifiers, operations comprising:
parsing, by the computer server, the damage survey information into portions of damage survey information based upon the respective physical plant type identifiers; and
routing, by the computer server, the portions of damage survey information to respective disaster recovery dispatch units, of the plurality of disaster recovery dispatch units, based upon the physical plant types that each respective disaster recovery dispatch unit is pre-assigned to repair.

2. The method of claim 1, wherein the damage survey information further comprises a geographical location for each physical plant damaged in the disaster event, the geographical location comprising at least one of a latitude/longitude coordinate pair, a state identification, a city identification, a street identification, a cross street identification, an intersection identification, a region identification, and a region subset identification.

3. The method of claim 2, further comprising:
determining, by the computer server, based upon the geographical location for each physical plant, whether repair of any of the physical plants damaged in the disaster event should be prioritized; and
routing, by the computer server, in response to the computer server determining that repair of a specific physical plant of the physical plants damaged in the disaster event should be prioritized, the damage survey information associated with the specific physical plant to the disaster recovery dispatch unit, of the plurality of disaster recovery dispatch units, that is pre-assigned to repair the specific physical plant as determined through the analyzing prior to routing the damage survey information associated with other of the disaster recovery dispatch units to which the damage survey is to be routed.

4. The method of claim 1, wherein the damage survey information further comprises a damage assessment for each physical plant damaged in the disaster event, the damage assessment comprising at least one of a damage description, an estimated repair cost, a repair materials source, a revenue impact factor, a humanitarian impact factor, and an emergency services impact factor.

5. The method of claim 4, further comprising:
determining, by the computer server, based upon the damage assessment for each physical plant, whether repair of any of the physical plants damaged in the disaster event should be prioritized; and
routing, by the computer server, in response to the computer server determining that repair of a specific physical plant of the physical plants damaged in the disaster event should be prioritized, the damage survey information associated with the specific physical plant to the disaster recovery dispatch unit, of the plurality of disaster recovery dispatch units, that is pre-assigned to repair the specific physical plant as determined through the analyzing prior to routing the damage survey information associated with other of the disaster recovery dispatch units of the plurality of disaster recovery dispatch units.

6. The method of claim 1, wherein the analyzing, by the computer server, comprises analyzing, by the computer server, the damage survey information to determine to which of an engineering disaster recovery dispatch unit, a construction disaster recovery dispatch unit, and an installation and maintenance disaster recovery dispatch unit the computer server should route the damage survey information.

7. The method of claim 6, wherein:
the engineering disaster recovery dispatch unit is pre-assigned to repair physical plant types selected from a first group of physical plant types, the first group consisting of poles, optical network units, distribution units, cross connect units, and remote terminal units;
the construction disaster recovery dispatch unit is pre-assigned to repair physical plant types selected from a second group of physical plant types, the second group consisting of power hazards, tree trimming, and cable spans; and
the installation and maintenance disaster recovery dispatch unit is pre-assigned to repair drops.

8. The method of claim 1, further comprising receiving, by the computer server, an update from a disaster recovery dispatch unit, of the plurality of disaster recovery dispatch units, to which the computer server routed the damage survey information, the update comprising an indication that a project created by one of the disaster recovery dispatch unit and the computer server has been completed.

9. The method of claim 8, wherein receiving, by the computer server, the update from the disaster recovery dispatch unit comprises receiving, by the computer server, the update intermittently or periodically.

10. The method of claim 1, further comprising generating, by the computer server, a report comprising at least one of an actual repair cost, a revenue loss value, a repair materials source, and a subscriber loss value.

11. A computer-readable storage medium, for use at a disaster recovery computer server, comprising computer-executable instructions that, when executed by a computer-processing unit of the disaster recovery computer server, cause the computer-processing unit to perform operations, for processing damage survey information associated with a disaster event, comprising:
receiving the damage survey information including:
an area of impact defining an area in which at least one physical plant was damaged in the disaster event; and
a physical plant type identifier for each physical plant damaged in the disaster event, each physical plant type identifier identifying a physical plant type of a plurality of physical plant types;
analyzing the damage survey information to determine to which of a plurality of disaster recovery dispatch units the disaster recovery computer server should route the damage survey information;
routing, in response to the computer-processing unit determining, based on the analyzing, that all physical plants damaged in the disaster event are associated with the same physical plant type, as identified by their respective physical plant type identifiers, damage survey information to a disaster recovery dispatch unit, of the plurality of disaster recovery dispatch units, that is pre-assigned to repair the physical plant type identified by the respective physical plant type identifiers;
routing, in response to the computer-processing unit, based on the analyzing, that all physical plants damaged in the disaster event are not of the same type, but are associated by their physical plant types with a physical plant type of a group of physical plant types that a specific disaster recovery dispatch unit of the plurality of disaster recovery dispatch units is pre-assigned to repair, the damage survey information to the specific disaster recovery dispatch unit of the plurality of disaster recovery dispatch units that is pre-assigned to repair the group of physical plant types; and
performing, in response to the computer-processing unit determining, based on the analyzing, that at least some of the physical plants damaged in the disaster event are associated with different physical plant types that are not all part of the group of physical plant types, as identified by their respective physical plant type identifiers, further operations comprising:
parsing the damage survey information into portions of damage survey information based upon the respective physical plant type identifiers; and
routing, respectively, the portions of damage survey information to respective disaster recovery dispatch units, of the plurality of disaster recovery dispatch units, based upon the physical plant types that each respective disaster recovery dispatch unit is pre-assigned to repair.

12. The computer-readable storage medium of claim 11, wherein the damage survey information further comprises a geographical location for each physical plant damaged in the disaster event, the geographical location comprising at least one of a latitude/longitude coordinate pair, a state identification, a city identification, a street identification, a cross street identification, an intersection identification, a region identification, and a region subset identification.

13. The computer-readable storage medium of claim 12, wherein the operations further comprise:
determining, based upon the geographical location for each physical plant, whether repair of any of the physical plants damaged in the disaster event should be prioritized; and
routing, in response to the computer-processing unit determining that repair of a specific physical plant of the physical plants damaged in the disaster event should be prioritized, the damage survey information associated with the specific physical plant to the disaster recovery dispatch unit, of the plurality of disaster recovery dispatch units, that is pre-assigned to repair the specific physical plant as determined through the analyzing prior to routing the damage survey information associated with other of the disaster recovery dispatch units to which the damage survey is to be routed.

14. The computer-readable storage medium of claim 11, wherein the damage survey information further comprises a damage assessment for each physical plant damaged in the disaster event, the damage assessment comprising at least one of a damage description, an estimated repair cost, a repair materials source, a revenue impact factor, a humanitarian impact factor, and an emergency services impact factor.

15. The computer-readable storage medium of claim 14, wherein the operations further comprise:
   determining, based upon the damage assessment for each physical plant, whether repair of any of the physical plants damaged in the disaster event should be prioritized; and
   routing, in response to the computer-processing unit determining that repair of a specific physical plant of the physical plants damaged in the disaster event should be prioritized, the damage survey information associated with the specific physical plant to the disaster recovery dispatch unit, of the plurality of disaster recovery dispatch units, that is pre-assigned to repair the specific physical plant as determined through the analyzing prior to routing the damage survey information associated with other of the disaster recovery dispatch units to which the damage survey is to be routed.

16. A disaster recover system, for processing damage survey information associated with a disaster event, comprising:
   an input interface configured to receive the damage survey information associated with the disaster event;
   a computer-processing unit; and
   a computer-readable medium comprising computer-executable instructions that, when executed by the computer-processing unit, cause the computer-processing unit to perform operations, for processing the damage survey information associated with the disaster event, comprising:
      receiving, via the input interface, the damage survey information including:
         an area of impact defining an area in which at least one physical plant was damaged in the disaster event; and
         a physical plant type identifier for each physical plant damaged in the disaster event, each physical plant type identifier identifying a physical plant type of a plurality of physical plant types;
      analyzing the damage survey information to determine to which of a plurality of disaster recovery dispatch units the disaster recovery system should route the damage survey information;
      routing, in response to the computer-processing unit determining, based on the analyzing, that all physical plants damaged in the disaster event are associated with the same physical plant type as identified by their respective physical plant type identifiers, the damage survey information to a disaster recovery dispatch unit, of the plurality of disaster recovery dispatch units, that is pre-assigned to repair the physical plant type identified by the respective physical plant type identifiers;
      routing, in response to the computer-processing unit determining, based on the analyzing, that all physical plants damaged in the disaster event are not of the same type, but are associated by their physical plant types with a physical plant type of a group of physical plant types that a specific disaster recovery dispatch unit of the plurality of disaster recovery dispatch units is pre-assigned to repair, routing the damage survey information to the specific disaster recovery dispatch unit of the plurality of disaster recovery dispatch units that is pre-assigned to repair the group of physical plant types; and
      performing, in response to the computer-processing unit determining, based on the analyzing, that at least some of the physical plants damaged in the disaster event are associated with different physical plant types that are not all part of the group of physical plant types, as identified by their respective physical plant type identifiers, further operations comprising:
         parsing the damage survey information into portions of damage survey information based upon the respective physical plant type identifiers; and
         routing, respectively, the portions of damage survey information to respective disaster recovery dispatch units, of the plurality of disaster recovery dispatch units, based upon the physical plant types that each respective disaster recovery dispatch unit is pre-assigned to repair.

17. The disaster recovery system of claim 16, wherein the damage survey information further comprises a geographical location for each physical plant damaged in the disaster event, the geographical location comprising at least one of a latitude/longitude coordinate pair, a state identification, a city identification, a street identification, a cross street identification, an intersection identification, a region identification, and a region subset identification.

18. The disaster recovery system of claim 17, wherein the operations further comprise:
   determining, based upon the geographical location for each physical plant, whether repair of any of the physical plants damaged in the disaster event should be prioritized; and
   routing, in response to the computer-processing unit determining that repair of a specific physical plant of the physical plants damaged in the disaster event should be prioritized, the damage survey information associated with the specific physical plant to the disaster recovery dispatch unit, of the plurality of disaster recovery dispatch units, that is pre-assigned to repair the specific physical plant as determined through the analyzing prior to routing the damage survey information associated with other of the disaster recovery dispatch units to which the damage survey information is to be routed.

19. The disaster recovery system of claim 16, wherein the damage survey information further comprises a damage assessment for each physical plant damaged in the disaster event, the damage assessment comprising at least one of a damage description, an estimated repair cost, a repair materials source, a revenue impact factor, a humanitarian impact factor, and an emergency services impact factor.

20. The disaster recovery system of claim 19, wherein the operations further comprise:
   determining, based upon the damage assessment for each physical plant, whether repair of any of the physical plants damaged in the disaster event should be prioritized; and
   routing, in response to the computer-processing unit determining that repair of a specific physical plant of the physical plants damaged in the disaster event should be prioritized, the damage survey information associated with the specific physical plant to the disaster recovery dispatch unit, of the plurality of disaster recovery dispatch units, that is pre-assigned to repair the specific physical plant as determined through the analyzing prior to routing the damage survey information associated with other of the disaster recovery dispatch units.

\* \* \* \* \*